United States Patent
Van Horn et al.

[11] 3,867,230
[45] Feb. 18, 1975

[54] TIRE BUILDING MACHINE

[75] Inventors: Russell F. Van Horn, Tipp City; Lowell D. Bok, Anna; Albert C. King, Jr., Troy; Ronald R. Suerdieck, Tipp City; Arthur J. Thrower, Troy, all of Ohio

[73] Assignee: The B. F. Goodrich Company, New York, N.Y.

[22] Filed: Apr. 30, 1974

[21] Appl. No.: 465,696

Related U.S. Application Data

[63] Continuation-in-part of Ser. No. 330,721, Feb. 8, 1973, abandoned.

[52] U.S. Cl............ 156/417, 156/128 I, 156/398, 156/414, 156/415, 242/72, 279/2
[51] Int. Cl................... B29h 12/16, B29h 17/28
[58] Field of Search................. 156/110, 123–133, 156/128 I, 394, 398, 403, 414–420; 242/72; 279/2

[56] References Cited
UNITED STATES PATENTS

| | | |
|---|---|---|
| 3,101,289 | 8/1963 | Giletta............................ 156/133 |
| 3,414,446 | 12/1968 | Pearce et al...................... 156/403 |
| 3,485,692 | 12/1969 | Frazier............................ 156/415 |
| 3,492,184 | 1/1970 | Brey et al........................ 156/414 |
| 3,607,558 | 9/1971 | Nebout............................ 156/415 |
| 3,637,450 | 1/1972 | Bryant............................ 156/415 |
| 3,674,604 | 7/1972 | Gazuit............................ 156/415 |
| 3,765,987 | 10/1973 | Brey............................... 156/415 |

Primary Examiner—Clifton B. Cosby
Assistant Examiner—John E. Kittle
Attorney, Agent, or Firm—Joseph Januszkiewicz

[57] ABSTRACT

A tire shaping apparatus for shaping into a toroidal form a green tire carcass built in the form of a flat band which utilizes a plurality of radially moveable supports having accordian-type pleated plates interconnected between the moveable supports which expands a bladder supported thereon circumferentially uniformly to shape a tire carcass radially while moving the respective bead portions axially inwardly toward each other.

20 Claims, 13 Drawing Figures

3,867,230

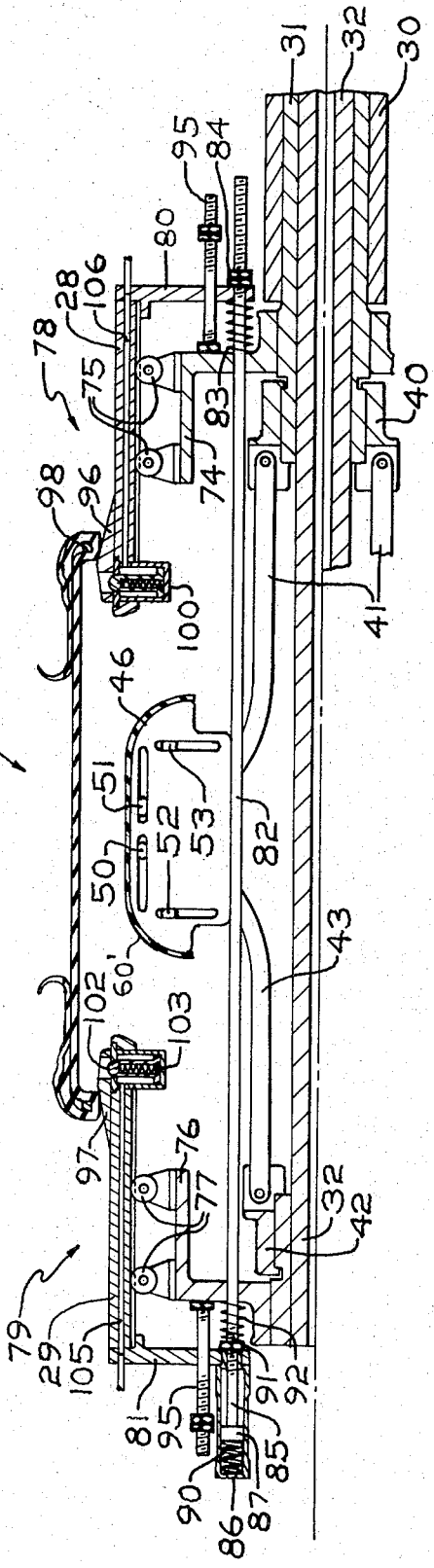

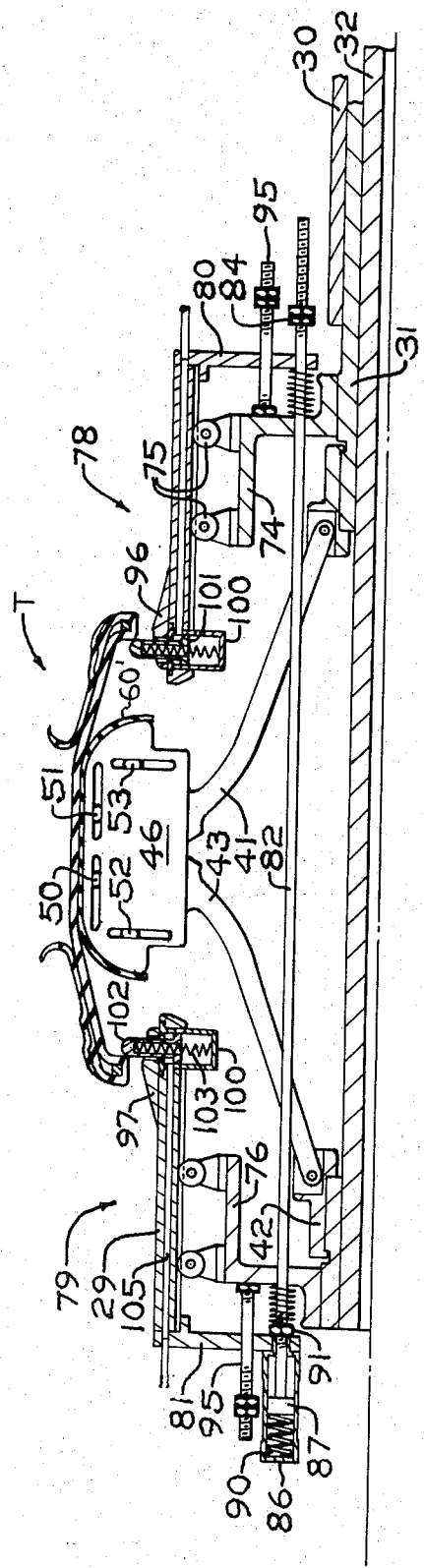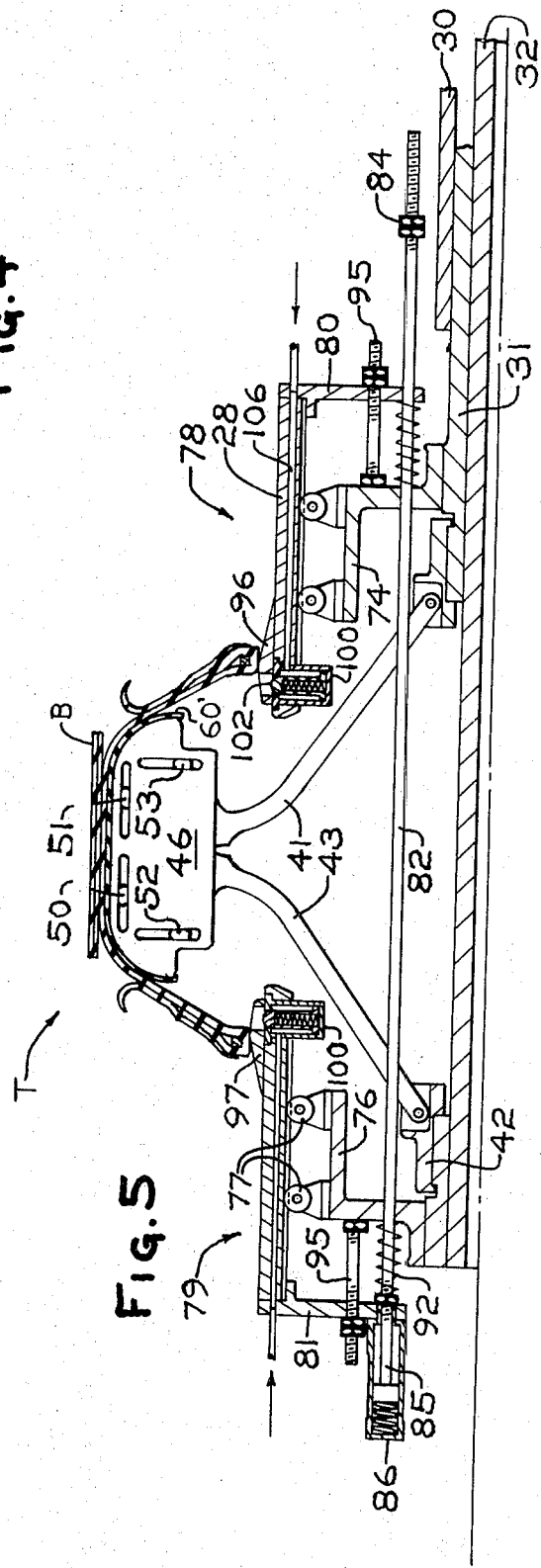

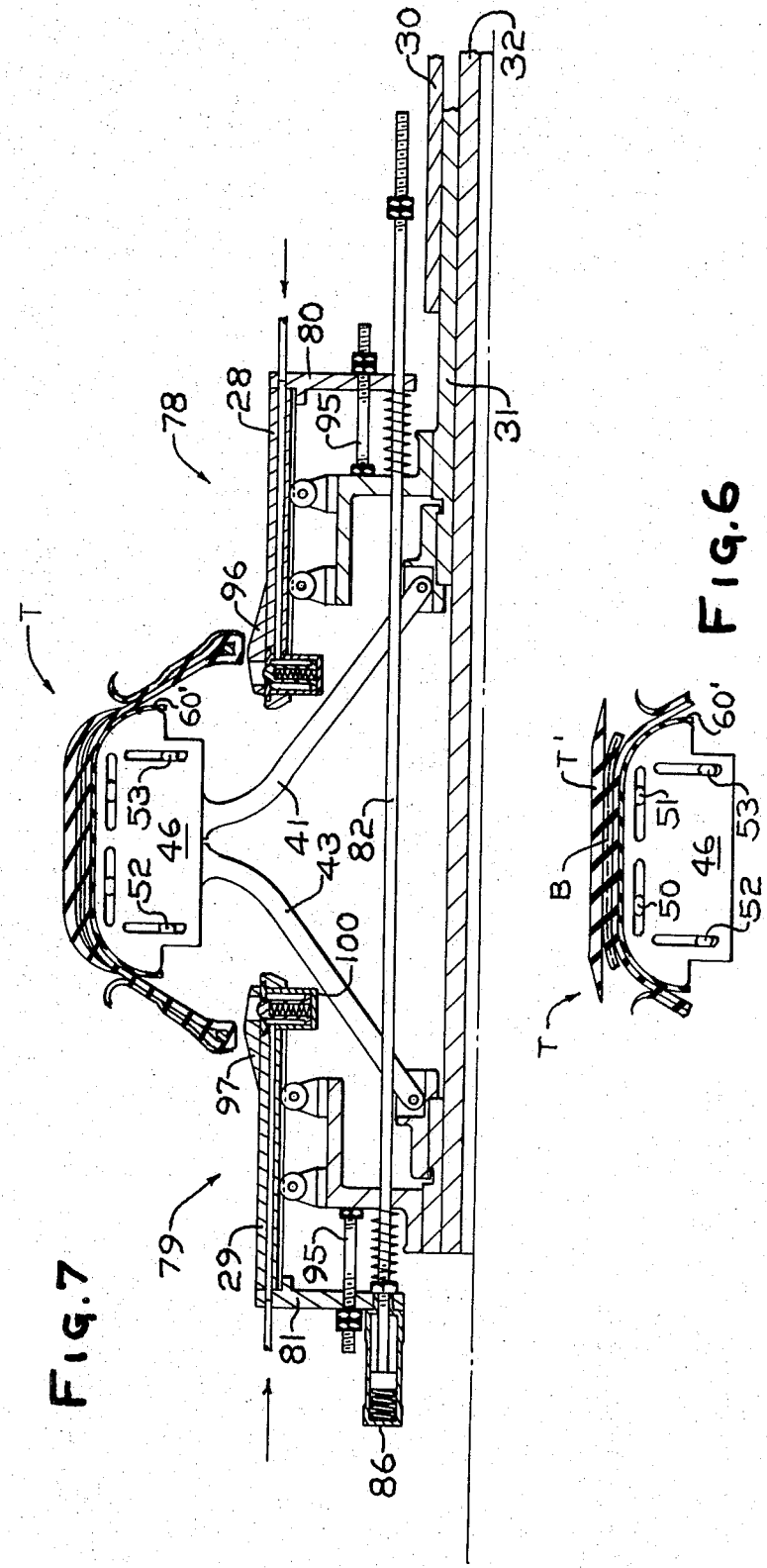

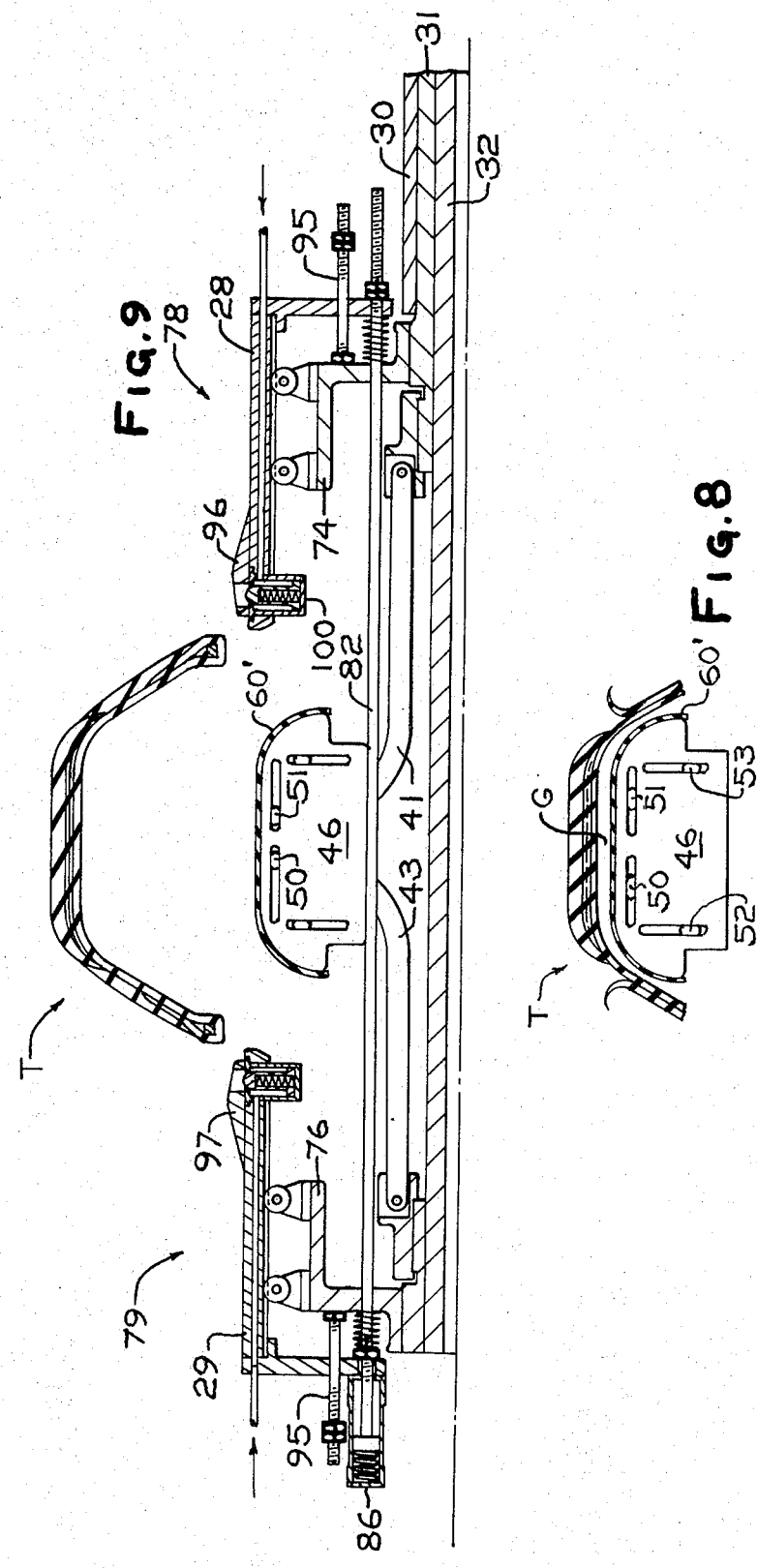

Fig. 10
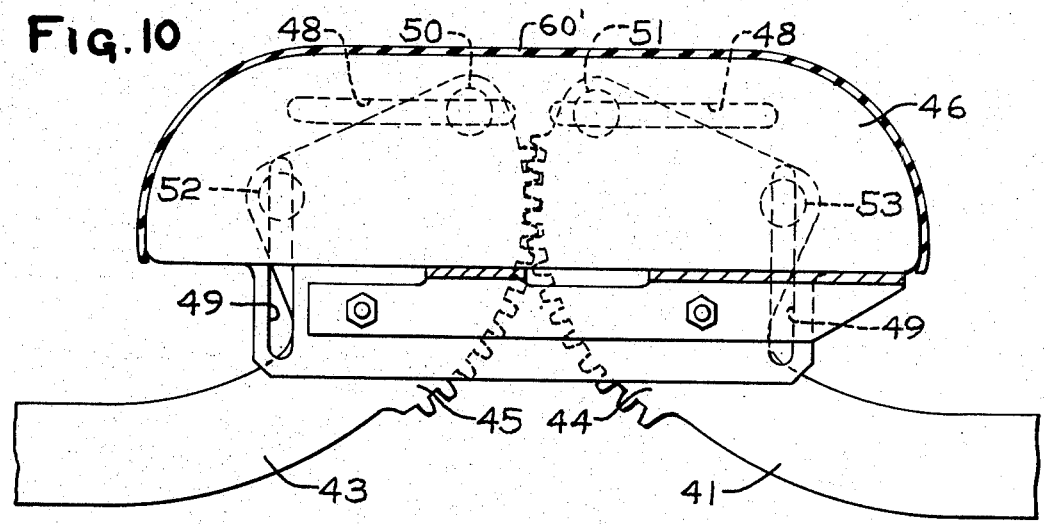
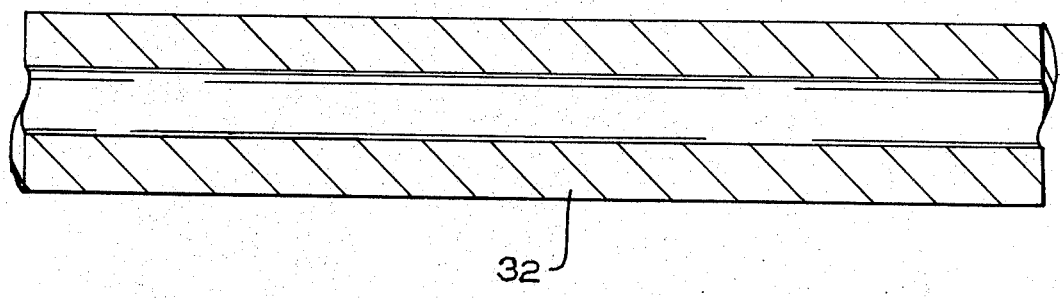
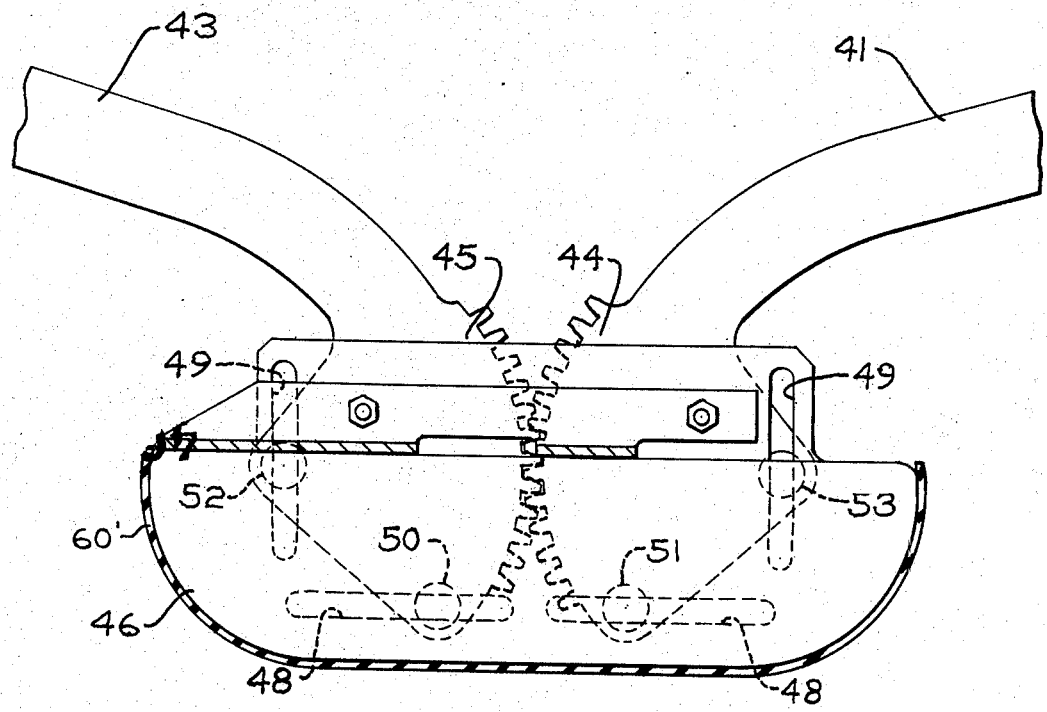

TIRE BUILDING MACHINE

This application is a continuation in part of U.S. Patent application Ser. No. 330,721, filed Feb. 8, 1973, now abandoned.

BACKGROUND OF THE INVENTION

This invention relates to an apparatus for shaping tires and more particularly to an apparatus for shaping a green tire carcass built in the so-called flat band form after which belts and a tire tread may be placed thereon.

In the flat band method of building tires, plies of rubberized cord fabric constituting the carcass are laid over a cylindrical drum-like structure, with the edges of the plies wrapped in various methods about the axially spaced beads. After the sidewalls and the chafer strips are applied, the drum is collapsed and the tire in the so-called flat band form is removed and placed on a second step machine. Such band form is then shaped having the center portion thereof expanded radially into a toroidal form while the axially spaced beads are moved axially inwardly. Belts and tread strips are then placed thereon to complete the green tire. The second step drum is then collapsed and the green tire removed therefrom. The use of the second step machine and its collapsible drum facilitates the fabrication of the green tire. Such tire shaping drums utilize a pneumatic bladder to aid in the forming process; however, these drums do not provide sufficient support for stitching, will distort the carcass and require considerable maintenance. The mechanical type of drum which is composed of outer segments which telescope as the drum is expanded, and oftentimes will have the sectors slide circumferentially as they move radially, thus distorting the tire carcass, and contributing to the nonuniformity of the tire. This problem is particularly magnified in the radial tire carcass which has the radial construction and will yield unevenly circumferentially if uneven pressure or sliding is applied.

SUMMARY OF THE INVENTION

The present invention contemplates a second step radially expandable drum that has a plurality of radially moveable supports which are pivoted radially outwardly in a unique manner having accordian-type pleated plates interconnected between the movable supports to provide for an expansion of the drum deck and its covering bladder which will result in uniform spread of the radial cords. With such accordian plate tire construction, there is obtained a true radius of curvature of the drum deck at the desired expanded diameter. With such accordian pleated type of construction and its supporting bladder, the radial expansion is uniform and eliminates the sliding motion between the drum and the tire carcass during the drum's radial expansion. In addition, such structure facilitates flexibility in handling different size tire carcasses. Such drum and the cooperative bladder provides a durable, strong, and solid building drum deck which will provide repeatable, accurate and dependable high quality tires.

BRIEF DESCRIPTION OF THE DRAWINGS

FIG. 2 is a front cross-sectional view of a portion of the expandable drum in its collapsed condition with a tire carcass positioned thereon;

FIG. 3 shows the positioning and centering of a tire carcass on the drum which is shown in cross section;

FIG. 4 shows the preliminary shaping of a tire carcass by the radial expansion of the drum;

FIG. 5 shows the shaping of the tire carcass to the toroidal form and the application of belt plies to the tire carcass, and the collapsing of the pins for centering of the tire carcass;

FIG. 6 shows a portion of the tire carcass with belt and tread stock positioned thereon;

FIG. 7 shows the tire carcass with the sidewalls, belt and tread stock stitched thereto;

FIG. 8 is a fragmentary cross-sectional view of a portion of a tire carcass and the tire drum, showing the drum collapsed slightly prior to the stitching of the sidewalls.

FIG. 9 is a fragmentary cross-sectional view of a portion of a tire carcass with the sidewalls turned over onto the tire carcass and stitched thereto, showing the drum in its collapsed condition.

FIG. 10 is a fragmentary cross-sectional view of a portion of the drum showing the meshing of the gear sectors in a collapsed condition in the upper portion thereof and with the gear sectors and lever arm members that support such gear sectors in the expanded condition of the drum in the lower portion of the Figure;

DETAILED DESCRIPTION

Figure 1:
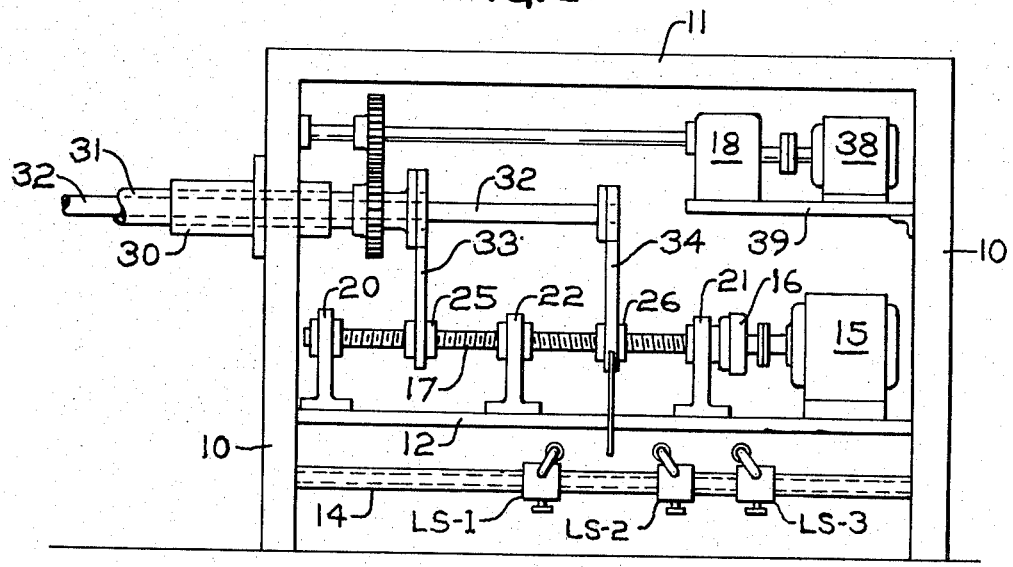
FIG. 1 is a side elevational view in schematic representation of the drive means of a tire shaping and building apparatus.
Figure 12:
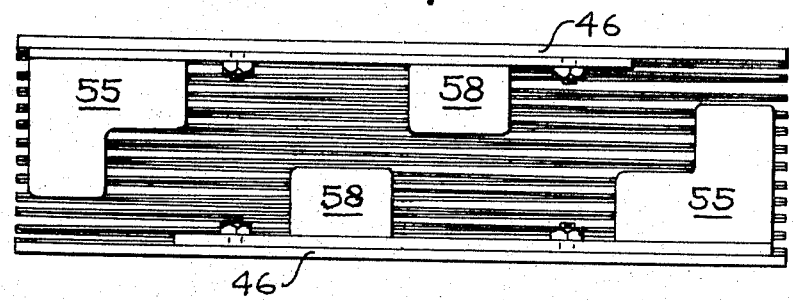
FIG. 12 is a plan view of a portion of the tire shaping and building drum taken along line 10—10 of FIG. 11.
Figure 13:
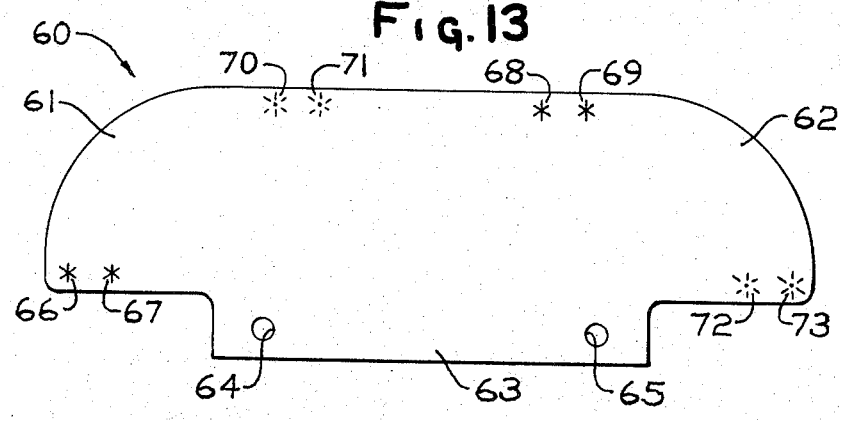
FIG. 13 is a front elevational view of a plate which is used in the drum of the tire shaping and building apparatus.
Figure 11:
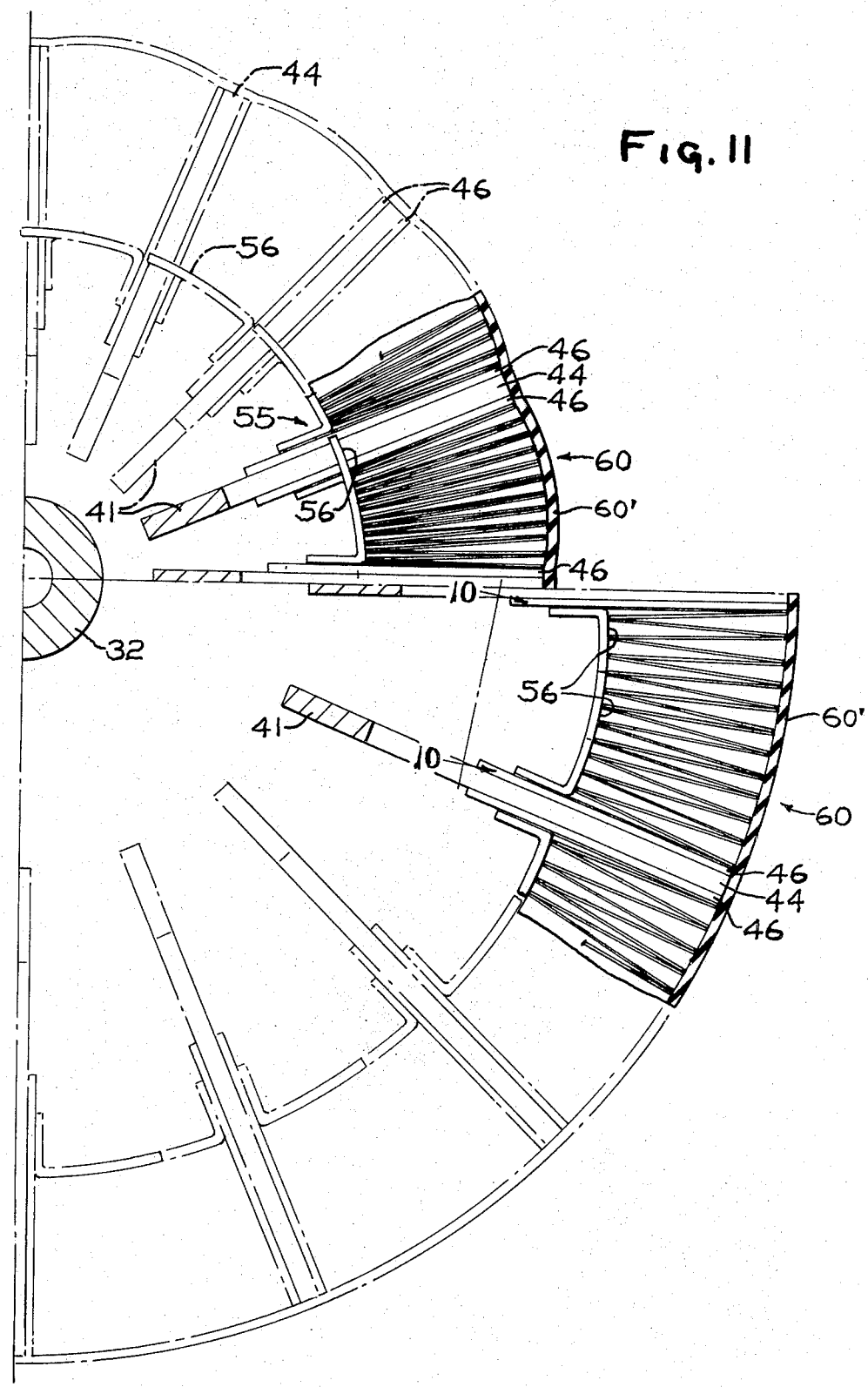
FIG. 11 is a fragmentary cross-sectional view of the tire shaping and building drum with a portion thereof in expanded condition and in a collapsed condition with the bladder thereon.

Referring now to the drawings wherein like reference characters designate like or corresponding parts throughout the several views, there is shown in FIG. 1 a portion of a tire shaping and building apparatus which comprises the means for expanding a tire building drum radially from a collapsed position to the expanded portion as shown in FIG. 5 wherein a plurality of vertically extending supports 10 are interconnected by a plurality of brackets 11 and a horizontally disposed plate member 12. Mounted between a pair of spaced supports 10 is a guideway 14 which supports a plurality of limit switches LS-1, LS-2 and LS-3. Such limit switches may be adjusted on the guideway to facilitate control of the starting and stopping of a motor which expands the drum radially. Mounted on plate member 12 is a variable speed reversible drive motor 15 whose output shaft is connected via a clutch 16 to a shaft 17. Shaft 17 is supported for rotation at the respective end portions by support members 20, 21 and its center by a support member 22. Shaft 17 has left- and right-hand screw threads which are encompassed by a pair of spaced nuts 25 and 26 which are journaled on shaft 17 such that rotation of shaft 17 will move such nuts 25 and 26 toward or away from each other in accordance with the rotation of shaft 17. A flanged bearing support means 30 is suitably attached to a pair of vertically extending supports 10 as shown in FIG. 1, which support means 30 supports for rotation a sleeve 31 and a tubular shaft 32, which shaft 32 is journaled in sleeve 31. Shaft 32 is keyed to sleeve 31 to permit axial movement of sleeve 31 relative to shaft 32. A bracket 33 has one end suitably secured to a nut 25 with its other end suitably bifurcated and connected to the one end of sleeve 31 such that rotation of shaft 17 will linearly move nut 25 along with bracket 33 and sleeve 31; however, permitting sleeve 31 to be rotated along with tubular shaft 32 by the splined connection therebetween. A bracket 34 has one end suitably secured to a nut 25 with its outer end suitably bifurcated and connected to one end of shaft 32 to provide linear movement of shaft 32 when shaft 17 is rotated. A motor 38, mounted on a bracket 39, has its output shaft suitably connected via transmission means 18 to sleeve 31 to rotate such sleeve which, in turn, will rotate shaft 32 and the members of the tire building drum in a manner to be described. Sleeve 31 has an annular ring 40 suitably secured to its end portion as shown in FIG. 2 to which is secured a plurality of circumferentially spaced levers 41, which levers form a first set of circumferentially spaced levers. Such levers 41 have their one ends pivotally connected to the annular ring 40 as shown in FIG. 2. Tubular shaft 32 has an annular ring 42 suitably secured to the other end portion thereof and has a plurality of longitudinally extending circumferentially spaced levers 43 pivotally secured thereto. Such plurality of circumferentially spaced levers 43 form a second set of circumferentially spaced levers. The respective upper end portions of levers 41 and 43 have gear sectors 44 and 45, respectively, which intermesh such that as tubular shaft 32 and sleeve 31 are moved toward each other at their outer end portions, levers 41 and 43 will provide a pivoting action such that the respective gear sectors 44 and 45 will mesh and rotate to pivot the outermost end portions of such levers 41 and 43 upwardly and outwardly away from the longitudinal center line of tubular shaft 32 from the position shown in FIG. 2 to the position shown in FIG. 5. The meshing engagement of the gear sectors 44 and 45 are kept in alignment by a pair of spaced support members 46—46 as shown in FIG. 11. Each support member 46 (FIGS. 11 and 12) has a pair of horizontally extending slots 48—48 and a pair of vertically extending slots 49—49, respectively, which slots are in alignment with the adjacent support member 46. The outermost end portion of each lever 41 and lever 43 which contain the gear sectors 44 and 45 additionally contains a pair of spaced pins 50, 51, 52, and 53. Pins 50, 51 are received by their respective slots 48 and 48 while the pins 52, 53 are received by respective slots 49—49. Such interconnection by the pair of pins with the slots of support member 46 provides a unique pivoting action which will be described in the operation hereinafter. As shown in FIGS. 11 and 12, each plate member 46 has an L-shaped bracket 55 such that the upper portion of the bracket 55 contains an arcuate surface portion 56 which defines a curvature to facilitate the support of the unique drum and a corresponding tire carcass in a manner to be described. In addition, support members 46—46 have a smaller bracket 58—58 (FIG. 12) secured to the lower portion in line with bracket 55 such that upon movement of the support members 46—46 towards each other as shown in FIG. 11, the L-shaped brackets 55—55 and 58—58 will interlock to permit such support members 46—46 to form a closed annular surface as depicted in FIG. 11. Interconnected between adjacent support members 46 are a plurality of thin flexible plates or plate members 60 forming a group of plate members which have an accordian type of connection therebetween. As shown in FIG. 13, each plate or plate member 60 has a pair of spaced arcuate portions 61-62 with a lower projecting portion 63. The plate 60 of each group of plates has one plate that is closest to the support member 46 and is connected thereto as by suitable rivet means 64-65. To form the drum's accordian pleated structure as shown in FIGS. 11 and 13, the next adjacent flexible plate member 60 is secured thereto as by spot welding as at 66-67, the lower left-hand portion as shown in FIG. 13, and at 68-69, the upper right-hand portion of such plate member. The next succeeding flexible plate member that is attached to this is shown in FIG. 13 in phantom lines as at 70-71 and at 72-73. The next succeeding plate member that is attached thereto is at 66, 67, 68 and 69. Successive members are thus alternately attached in the manner as previously described, thereby forming an accordian pleated drum structure which, upon expansion, will accordian out as shown in FIGS. 11 and 12 to shape a tire carcass, and upon collapse, will assume a closed drum structure which may be completely closed but, as depicted in FIG. 11, for clarity purposes is shown as slightly expanded to facilitate a proper showing of the manner in which these members expand. FIG. 12 discloses brackets 55 and 58 as supporting lower portion of such flexible plate members and, as shown in FIG. 11, such structures provide the additional support to maintain their arcuate shape. Suitably enveloping the plate members 60 of the drum is an elastomeric bladder or cover member 60' which essentially covers the entire circumference of the drum and its side portions (as clearly shown in cross section in FIG. 10). By the use of the bladder and the rigid accordian expansion of the supporting structure, a more uniform tire is built.

Rigidly secured to the outboard end portion of sleeve 31 (FIG. 2) is an annular support member 74, which support member 74 has suitably secured to its outer circumferential surface a plurality of rollers 75. Rigidly secured to the outboard end portion of tubular shaft 32 is an annular support member 76, which member 76 has a plurality of circumferentially spaced rollers 77 secured thereto. Encompassing the respective annular members 74 and 76 are carrier members 78-79 wherein each carrier member has a circular bottom plate 80-81, respectively, and a cylindrical portion 28-29. The inner cylindrical surface of the respective carrier members 78 and 79 are in rolling engagement with the respective rollers 75-77. The annular support members 74 and 76 have a plurality of circumferentially spaced axially extending bores in alignment with bores in the respective bottom plates 80-81 of carrier members 76 and 77. Extending axially through the respective bores of carrier members 76 and 77 and support members 74-76 are rods 82. Only one rod construction will be described as all others are similarly constructed. That portion of rod 82 which is positioned between carrier member 76 and support member 74 has a spring 83 encompassing such rod for biasing carrier member 78 rightwardly as viewed in FIG. 2. The rightwardmost end portion of rods 82 is threaded and has a nut 84 threaded thereon for adjusting the tension of such spring 83. The other end portion of rod 82 is suitably connected to a piston rod 85 which is housed in a cylinder 86, which cylinder 86 is suitably secured to the bottom plate 81 of annular support member 79. A piston 87, located within cylinder 86 and connected to rod 85, is biased by a spring 90 rightwardly as shown in FIG. 2. A nut 91 is suitably threaded onto the other end portion of rod 82 and limits the movement of the threaded rod or piston 85 into cylinder 86. A spring 92 encompassing rod 80 between carrier member 79 and annular support member 76 maintains a bias between such members to bias carrier member 79 leftwardly as shown in FIG. 2. Pressurization of the head end of cylinder 86 operates to compress the respective springs 83 and 92 which operate to center the respective carrier members 78 and 79 with respect to the center line of a tire carcass that is placed on the drum in a manner to be described, which action centers the tire on the drum. Such center line of the drum is equidistant from the respective outboard ends of sleeve 31 and shaft 32. Venting the head ends of cylinder 86 to atmosphere allows the compression springs 90 to relieve the tension on springs 92 and 83 to thereby facilitate the movement and positioning of a tire carcass onto the tire building drum and onto carrier members 78 and 79. The respective annular support members 74 and 76 have outwardly extending rods 95 which extend through the bottom plates 80 and 81. The ends of such rods 95 threadedly receive a nut to limit the axial movement of the carrier member 78 and 79 on the rollers 75–76. The respective adjacent end portions of the carrier members 78 and 79 have annular rings 96 and 97 suitably secured thereto, which rings 96 and 97 operate as means for locating the respective bead portions of a tire carcass that is to be shaped. Annular ring 96 has an annular abutment or bead locator 98 which serves as an abutment for locating the lateral portion of a tire carcass as it is slid longitudinally onto the tire shaping apparatus such that the right-hand most end portion will limit the axial movement thereon. Annular ring 96 may be replaceable to provide means for handling different size tire carcasses. Their innermost end portion of the respective carrier members 78 and 79 additionally have a plurality of circumferentially spaced pneumatically operated cylinders 100. Such cylinders have a piston 101 with a hollow outwardly extending rod 102. Rod 102 houses a spring 103 which biases the respective rods outwardly away from the center line of the tubular shaft 32. Pressurization of the rod for cylinder 101 moves the respective pins 102 downwardly into a retracted position as shown in FIG. 2. The pressurization of the rod end of cylinder 100 is accomplished by having a suitable controlled pressure source connected thereto via passageways 105 and 106 extending through carrier members 78 and 79, respectively.

In the operation of the apparatus described, assuming that the drum is in a collapsed condition as shown in FIG. 2, wherein the levers 41 and 43 are substantially horizontal with the support members 46 in its lowermost position and the accordian pleated structure of the respective group of plates in their collapsed condition facilitates the placement of a tire carcass T onto the tire building drum such that the one bead portion B comes into abutting contact with the annular abutment 97 which thereby positions the tire carcass onto the carrier members 78 and 78 in preparation for the expansion of the drum and bladder. The rod end of cylinders 100 are then connected to exhausts which thereby extends the rods 102 radially outwardly to engage the innermost bead portion of the tire carcass. Simultaneously with such action the rod end of cylinders 86 are connected to exhaust such that the compressed springs 90 move piston rods 85 rightwardly as viewed in FIGS. 2 and 3, thereby allowing the respective springs 83 and 92 to center the respective carrier members 78 and 79 to the center line of the drum which is in alignment with the center line of the plurality of circumferentially spaced support members 46 and the plates 60. This is shown in FIG. 3. Upon centering of such tire carcass, the operator then energizes motor 15 which rotates shaft 17 which, in turn, moves the respective outboard ends of sleeve 31 and tubular shaft 32 toward each other which thereby pivots the respective levers 41 and 43 about their interconnecting meshing connection. As such lever members are moved toward each other and gear sectors 46 rotate upwardly, the respective pins 52 and 53 move downwardly while the respective pins 50 and 51 move outwardly away from each other as shown in FIGS. 2 through 5. The advantage of this action is that the outermost end portion of the gear sectors do not require as much clearance space above their meshing engagement which would otherwise completely interfere with the shaping of a tire carcass since the pivot action drops the pins maintaining a low smooth profile across the top of the tire carcass, yet maintains a stable support for the expanding drum and the cover member 60' which contributes to the tire uniformity. This action facilitates the shaping action of the long cylindrical tire carcass into a toroidal form as shown in FIG. 5, after which a pair of belts or breakers B are placed onto the tire carcass. The lever members 41 and 43 are then moved toward each other a further increment to raise the plate members 60 and the support members 46 along with the bladder 60, which action provides an arch to the circumferential side edges of the belt 60'. Thereafter a tread T' is placed thereon and stitched to the tire carcass along with the belt B to a form whose cross section is depicted by FIG. 7. The lever members 41 and 43 are then moved away from each other a slight increment to lower the plate members 60, support members 46 along with the bladder 60', to provide a gap G of approximately 1 inch between the bladder 60' and the inner circumferential surface of the carcass as depicted by FIG. 8. Such action breaks away the tire carcass from the top surface of the drum making it much easier to subsequently remove the tire carcass from the drum. Thereafter the respective sidewall portions of the tire carcass are turned over onto the tire carcass and stitched thereto to form a completed toroidal shaped tire carcass as depicted by FIG. 9. By the energization of motor 15, and in reversing the rotation thereof, moves the respective levers 41 and 43 downwardly toward the longitudinal center line of tubular shaft 32, which action retracts the respective support members 46 and the accordian pleated shaped drum with the flexible plates 60, the bladder 60' and the supporting structure to the position shown in FIG. 9 which permits the removal of the completed shaped tire carcass and conditions the apparatus for a second repeat operation. By the use of the bladder, a more uniform tire is built. Such bladder increases the life of the drum as it keeps dirt out away from the accordian pleated drum segments. The step of providing a gap between the tire carcass and the bladder prior to the stitching of the sidewall increases the useful life of the bladder significantly and facilitates the removal of the tire carcass from the drum during the collapsing of the drum.

A modification of the above-described apparatus is to eliminate the elastomeric cover from the drum and rely on the drum segments themselves to support the tire carcass. The value of the radially expandable flexible plates from a closed accordian form to the expanded from is desirable to give even radial expansion without distorting the tire carcass especially in radial tires wherein sliding contact by movable drum segments would tend to distort the tire carcass. The even distribution of the radial segments or plates provides for an even distribution of the impact loading and stresses.

The feasibility of substituting a 15-inch ring for a 14-inch ring 96 coupled with the ability of expanding the drum to accommodate different size by regulating the position of limit switches LS-1, LS-2 and LS-3 provides a tire building and shaping drum that can shape different size tires economically and rapidly. The switches permits the expansion of the tire drum and to incremently increase or decrease the diameter size as where the operator is to provide for a gap G between the bladder 60' and the inner surface portion of the tire carcass.

Various modifications are contemplated and may obviously be resorted to by those skilled in the art without departing from the described invention, as hereinafter defined by the appended claims, as only preferred embodiments thereof have been disclosed.

We claim:

1. A tire shaping and building drum comprising: a base; a shaft supported on said base for rotation about a center line; a sleeve journaled on said shaft for rotation therewith, drive means operatively connected to said shaft and said sleeve for selectively moving one end of said shaft and one end of said sleeve axially toward or away from each other; a first set of circumferentially spaced lever members having one end pivotally mounted on said one end of said shaft; a second set of circumferentially spaced lever members having one end pivotally mounted on said one end of said sleeve; means operatively connected to said shaft and said sleeve for rotating said shaft and said sleeve about a common axis; the other ends of all of said levers having gear sectors, said second set of lever members being in paired axial alignment with said first set of lever members; said gear sectors of said first set of lever members being in meshing engagement with said gear sectors of said second set of lever members; said drive means operatively upon actuation to meshingly engage and rotate said gear sector to raise and lower said other ends of said levers respectively through selective movement of said shaft and said sleeve; each pair of said intermeshing gear sectors having a support member pivotally supported thereby; each pair of circumferentially spaced adjacent support members having a plurality of plate members positioned therebetween, defining a group of plate members; the respective end plate member of each of said group of plate members is secured to the closest adjacent support member; adjacent ones of said plate members of each of said group of plate members being interconnected to adjacent plate members to form an accordian pleated support means which expands radially upon movement of said lever members upwardly and outwardly away from said center line.

2. A tire shaping and building drum as set forth in claim 1 wherein an elastomeric bladder covers said support members and plate members for movement therewith.

3. A tire shaping and building drum as set forth in claim 1 wherein each of said support members has at least a horizontally extending slot and a pair of spaced vertically extending slots, each lever member in each pair of intermeshing sectors having a pair of projections for riding in said horizontal and vertical slots, respectively, whereby said projections raise or lower said support members as said shaft and sleeve are moved axially toward or away from each other.

4. A tire shaping and building drum as set forth in claim 1 wherein said plate members are flexible and attached to adjacent plate members at spaced locations to provide a circumferential resiliency that permits radial expansion and contraction of said plate members as said lever members are moved toward or away from each other.

5. A tire shaping and building drum as set forth in claim 4 wherein an elastomeric bladder covers said support members and plate members that expands and contracts therewith.

6. A tire shaping and building drum as set forth in claim 5 wherein each of said plate members has a lower edge and upper peripheral edge; and each of said support members having a bracket extending outwardly therefrom to support said flexible plate member along said lower edge.

7. A tire shaping and building drum as set forth in claim 6 wherein a cylindrical carrier member is mounted on said shaft and said sleeve respectively, and radially expandable locator means are mounted on each of said carrier members for locating and centering a tire carcass on said drum.

8. A tire shaping and building drum as set forth in claim 7 wherein centering means interconnects said carrier members to position said carrier members equidistant from said plate members.

9. A tire shaping and building drum as set forth in claim 8 wherein said centering means includes a plurality of circumferentially spaced rods extending in a direction parallel to the axis of rotation of said shaft, and spring means on said rods biasing said carrier members outwardly away from said plate members in equal tension.

10. A tire shaping and building drum as set forth in claim 9 wherein power operated means is operatively connected to said rods which is operative upon actuation to move said carrier members toward each other to overcome the biasing and centering action of said spring means; and a bead locator means on one of said carrier members for locating a tire bead and carcass on said drum.

11. A tire shaping and building drum as set forth in claim 7 wherein said expandable locator means comprise a plurality of circumferentially spaced pistons with moveable rods that are operative upon actuation of said pistons to extend beyond the outer circumferential periphery of said carrier members.

12. An apparatus for shaping and building pneumatic tires comprising an expandable drum defined by a plurality of circumferentially spaced support members moveable radially inwardly and outwardly between inner and outer end positions, a plurality of flat flexible plate members located between adjacent support members forming a group of plates, the respective end plates of each group of plates is secured to the closest adjacent support member, said interconnected plates moveable radially outwardly and inwardly with said support members, said plates being interconnected in a circumferential pattern to form an accordian pleated arrangement which provides for movement of the respective plates radially inwardly or outwardly upon movement of said support members inwardly or outwardly respectively to define an arcuate surface in the outermost position of said plates, and actuating means connected to said support members for moving said support members between said inner and outer end positions.

13. An apparatus for shaping and building pneumatic tires as set forth in claim 12 wherein an elastomeric bladder covers said plates and support members for radial movement therewith.

14. An apparatus for shaping and building pneumatic tires as set forth in claim 13 wherein a pair of axially spaced carrier members are mounted on opposite sides of said expandable drum to locate a tire carcass in said drum, and each of said carrier members has a plurality of radially moveable pins for locating the respective side edges of a tire carcass.

15. An apparatus as set forth in claim 14 wherein each of said carrier members has an annular replaceable ring which provides a seat for the bead portions of a tire carcass, and one of said rings having an abutment for locating a tire carcass thereon.

16. An apparatus as set forth in claim 14 wherein said drum supports a pair of axially spaced annular members with circumferentially spaced rollers, said carrier members being in rolling engagement with said rollers, and biasing means interconnecting said carrier members for centering said carrier members relative to the center of said drum.

17. An apparatus as set forth in claim 13 wherein said accordian pleated arrangement is formed by said adjacent plates being interconnected by alternating the connection of adjacent plates to each other to permit circumferential movement relative to each other as said drum is expanded radially.

18. An apparatus as set forth in claim 17 wherein said actuating means includes a plurality of interconnected lever members that are moveable toward and away from each other in pairs, one end of each of said pair of interconnected lever members have intermeshing gear teeth to permit rotation therebetween, and each of said interconnected lever members having a pivoted sliding connection to said support members to facilitate radial movement of said plates.

19. An apparatus as set forth in claim 18 wherein pivotal sliding connection includes projections on each of said interconnected lever members, each of said support members being a thin flat member with an upper outer edge portion, side portions, and a bottom edge, a pair of horizontally extending slots adjacent to said upper outer edge portion, a pair of vertically extending slots in said side portion, and said projections of each lever member riding in one of said vertical slots and in one of said horizontal slots.

20. A machine for the manufacture of pneumatic tires having substantially inextensible elements, comprising a drum having a shaft rotatable about a center line, a plurality of circumferentially spaced levers mounted on said shaft for axial movement thereon, support members connected to said levers for movement in a radial direction, accordian pleated support means mounted between said support members for radial movement therewith, a bladder mounted on said support members for covering said support members and said accordian pleated support means and for radial expansion and contraction therewith, and drive means connected to said levers to selectively move said levers to control the selective radial position of said bladder support members and pleated support means to shape a tire carcass to toroidal form.

* * * * *